April 8, 1952  J. N. DE GRUCHY  2,592,014
WIRELESS NAVIGATION SYSTEM
Filed Aug. 5, 1947  2 SHEETS—SHEET 1

J.N. de Gruchy
Inventor
By
Attorneys

Patented Apr. 8, 1952

2,592,014

UNITED STATES PATENT OFFICE 2,592,014

WIRELESS NAVIGATION SYSTEM

John Norman de Gruchy, Rickmansworth, England

Application August 5, 1947, Serial No. 766,203
In Great Britain July 20, 1945

Section 1, Public Law 690, August 8, 1946
Patent expires July 20, 1965

3 Claims. (Cl. 343—103)

This invention relates to arrangements for the wireless navigation of mobile craft, such as aircraft, and is more particularly concerned with navigational systems in which measurement of the time interval between the reception at the mobile craft of the related signals of a pair of pulse signals serves to provide information to the navigator of the craft regarding, for instance, his bearing. By suitable repetition of such pulse pairs to form a series, a substantially continuous indication of the chosen information including any variation thereof may be provided. Similarly, by providing one or more further series of pulse pairs of distinguishable character interspaced between those of the first series, one or more further information-bearing indications may be obtained. Examples of such systems are to be found in co-pending United States Patent Applications Serial Nos.: 527,017, 527,018, 761,966, which has matured into Patent No. 2,585,374, Feb. 12, 1952, and an application of Frederic Calland Williams entitled Wireless Signalling Systems filed July 25, 1947, Serial No. 763,712, Patent No. 2,541,627 granted February 13, 1951, a United States application which corresponds to British application 13064/45.

One object of the present invention is to provide a simplified and improved form of mobile craft navigation apparatus for use with such systems while a second object is to provide a landing-aid system of simplified character, preferably using the same mobile craft navigation apparatus.

According to one feature of the present invention, the related signals of such pair of pulse signals of a series of repeated pairs, are arranged to control the starting and stopping instants respectively of a current or voltage pulse whose duration is thus equal to the time interval between the related pulses, the plurality of pulses thus obtained being integrated over a suitable time interval and employed to operate a meter capable of providing an indication suitable for direct reading. The arrangement may be suitably multiplied to deal with two or more series of pulse pairs.

In a preferred embodiment, the indicating means employed comprises a double-pointer 360° scale device one pointer of which indicates the number of whole units of interval time or of the related information while the second pointer indicates fractional amounts of one of said whole units.

According to a further feature of the invention, information is transmitted to an aircraft to facilitate its landing by the appropriate variation of the time-intervals between the related pulses of one or more series of pulse pairs, said information being for instance, the range of the aircraft from the landing point and/or the height of the aircraft above ground level and/or the coincidence or otherwise of the aircraft course with that of the required landing path.

In a convenient embodiment of this feature, information is provided of the range of the aircraft from the landing point and of its height above the ground, these indications being presented upon a double pointed indicator so arranged that by keeping the two pointers in coincidence while flying in the chosen landing direction, the aircraft descends along a predetermined glide path.

The correct azimuth bearing of the aircraft with respect to the landing point may be maintained by known means, e. g. by the well-known "Lorenz" system or, more preferably, by the provision of a further series of related pulse pairs which serve to transmit the desired information to the aircraft, this further information being presented upon a pointer type meter or other suitable indicator through apparatus similar to that already referred to. The "Lorenz" system is fully described in the textbook entitled Wireless Direction Finding by R. Keen, 3rd Edition (1938) pages 630 et. seq.

In the above described landing system the transmission of the requisite series of pulse pairs is effected from the ground by means under the control of suitable, e. g. radar, apparatus which serves to determine the instantaneous position of the landing aircraft and which automatically controls therefrom the appropriate time spacing between the related pulses of the transmitted pulse pairs.

If desired, the operation of such position-determining apparatus may be facilitated by use of the known interrogation and response technique as described, for instance, in co-pending United States application Serial No. 692,085.

In order that the above and further features of the invention may be more readily understood embodiments thereof will now be described, by way of example, with reference to the accompanying drawing in which.

The navigational aspect will first be described with relation to the use of a system such as that described in the aforesaid co-pending United States applications Serial Nos. 527,017 and 527,018.

Figure 1:
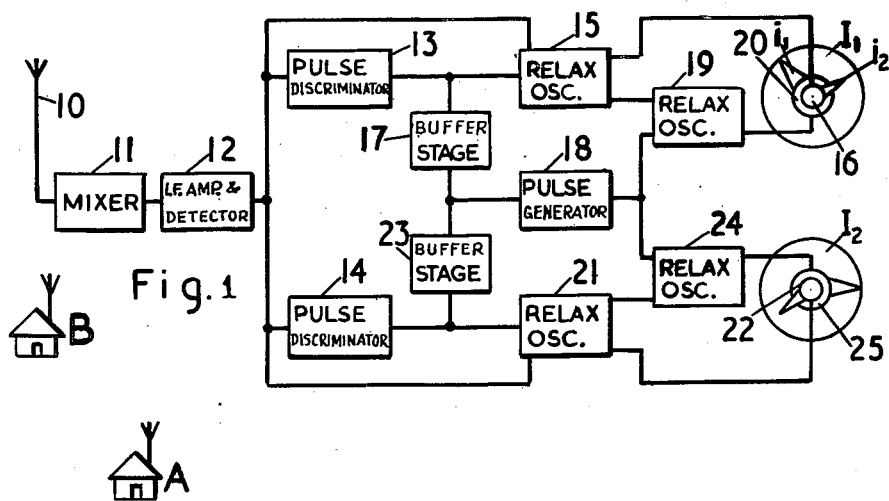
Figure 1 is a block schematic diagram of one form of apparatus for use in the mobile craft.

In the system shown in Figure 1 the time interval between the reception at the aerial 10 of a mobile craft of a pulse from one fixed location transmitter A and a related pulse from a second fixed and spaced transmitter B serves to indicate a locus line in space along which the mobile craft is located, while the similar measurement of the time interval between a further pulse from the transmitter A and a related pulse from a third fixed and spaced transmitter C determines a second locus line along which the mobile craft is also located. The intersection of these locus lines fixes the mobile craft position. These pulse pairs are repeated alternately at a suitable frequency, say 250 times per second, to form two series, hereinafter referred to as the A—B and A—C series respectively.

In order to avoid confusion between the various pulses received at mobile craft it is necessary to distinguish the A transmitter pulses from those of the transmitters B or C and also to distinguish the A pulse of the A—B series from the A pulse of the A—C series. This is conveniently effected by the allocation of different pulse widths to the various pulse signals. For the sake of example it will be assumed in the following description that the A station pulses of the A—B series are of two microseconds duration while the A station pulses of the A—C series are of three microseconds duration. The B and C station pulses are each of one micro-second duration.

The various pulse signals received at the mobile craft by aerial 10 are fed through R. F. amplifier and mixer stages 11 to I. F. amplifier and detector stages 12. The resultant output from unit 12, comprising a series of negative-going pulses, is fed to a pulse-width discriminator arrangement comprising units 13, 14. These units, operate in such manner as to provide a short output pulse in response to an applied pulse only if the latter is of a certain specific width. Thus the units may have discriminating means which derive separate signals from each received pulse and apply them with a predetermined relative delay corresponding to the width of a desired pulse to a tranfer circuit which operates only when such signals occur simultaneously. The transfer circuit may be a coincidence stage which is fed by two channels, one of which includes a time delay device, the arrangement being such that pulses are received over the channels and derived into time-spaced signals which are effective to operate the coincidence stage only when they are applied simultaneously, which occurs while the time spacing corresponds to the width of the pulses it is desired to accept. For the purpose described, the front and back edges of an incoming pulse may be differentiated: the back differential going direct to an electrode of the coincidence valve which also receives another electrode and after a delay the front differential reverses and operates if both differentials coincide. In the present case unit 13 provides an output pulse for each A pulse of the A—B series but for no other, whilst unit 14 provides an output pulse for each A pulse of the A—C series but no other.

The output from unit 13 is used to trigger a relaxation oscillator circuit of the so-called "flip-flop" kind in unit 15. This circuit is also supplied with the pulse-waveform output from unit 12. This waveform operates as a resetting medium and as a result the circuit 15 provides an output waveform comprising a series of squarewave pulses, each pulse being initiated by an A pulse of the A—B series and terminated by the next following pulse which is, of course, the related B pulse. Each square pulse is therefore proportional to the time-interval value between the related A and B pulses.

This output waveform is applied, if necessary, through suitable smoothing means, to a meter movement 16 forming part of an indicator I₁ whereby the pointer $i_1$ thereof takes up a position dependent upon the mean value of the output current which is in turn dependent upon the time duration of the pulses provided by unit 15 as averaged or integrated by the constants of the meter movement and any smoothing means provided. The indicator I₁, thus provides a direct reading of the time period of the A—B series of pulse pairs and accordingly provides an indication of the appropriate locus line on which the craft is positioned. For accuracy of reading, however, it is desirable to provide additional means by which fractions of the units indicated by the movement 16 may be accurately determined.

This is provided by the application of the output pulses from unit 13 (i. e. in coincidence with the A pulses of the A—B pairs) by way of a buffer stage 17 to a pulse generator unit 18 which serves to generate a series of pulses having a time spacing equal to one unit of the scale over which the pointer of the movement 16 operates. The pulses thus provided are locked to the initiating A pulse and accordingly occur at 1, 2, 3, 4, . . . unit time intervals thereafter.

The output pulse waveform from unit 18 is applied to a unit 19 which again takes the form of a relaxation oscillator circuit of the "flip-flop" type. Unit 19 is also supplied with the output square waveform from unit 15. The differentiated back edge of this latter waveform is arranged to trigger the flip-flop circuit while the next following unit time pulse from unit 18 serves to restore it to its normal condition. In consequence there is generated in unit 19 a square wave whose commencement is coincident with the reception of a B station pulse and whose termination is coincident in time with the next unit time-interval thereafter measured from the original A pulse which initiated the cycle. For example, assuming that the time interval between A and B equals 7⅓ units of the scale of meter 16 then the output square wave from unit 19 will commence at an instant equal to 7⅓ units after the related A station pulse and will terminate at 8 units thereafter. This square wave, which is a measure of the amount by which the time interval between related A and B pulses is less than the next larger whole number of scale units, is applied, if necessary through smoothing means, to a further meter movement 20 of the indicator I₁ to cause rotation of its pointer $i_2$ in a contra-direction to that of pointer $i_1$ whereby it indicates the fractional unit reading to a magnified scale, and this measurement may include the use of a saw tooth generator and a peak voltmeter with long time constant.

The movements 16 and 20 of the indicator I₁ may be of any suitable form.

They may be normal D. C. movements of the moving coil type, preferably arranged to provide as large an angle of pointer movement as possible. Alternatively they may be of so called "Desyn" type or as a further alternative movements including bi-directional impulse motors may be employed.

The output from unit 14 is applied to a similar arrangement of units 21, 23, 24 corresponding respectively to units 15, 17 and 19 already described. A common pulse generator 18 serves both arrangements. The outputs of this second chain of apparatus are applied to meter movements 22 and 25 of a second indicator $I_2$ said movements corresponding respectively with the movements 16 and 20 of indicator $I_1$ and serving to display the unit and fractional unit values of the time spacing of the related pulses of the A—C series.

A navigation arrangement as above described may be combined with known blind landing apparatus, e. g. the Lorenz system and, if desired, certain portions of the R. F. and I. F. stages above referred to may be employed as part of the recevier chain for the blind landing apparatus. It is possible however, to employ the apparatus as above described for landing aid purposes as an alternative role.

Figure 2:
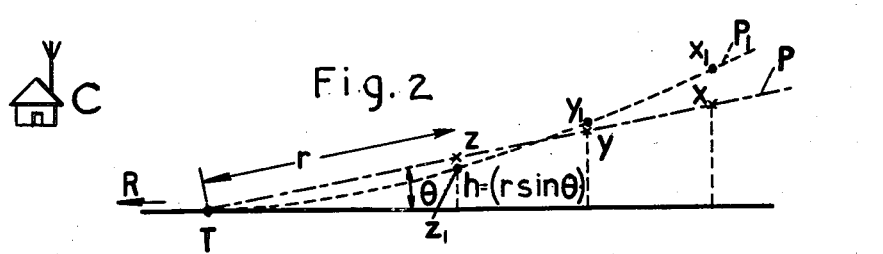
Figure 2 is a diagram illustrating an aircraft landing path.

Referring to Figure 2, the chain-dotted line P represents a chosen glide path for an aircraft desirous of landing at the point T at one end of a runway R. At point T is located suitable means e. g. radar apparatus by which the range $r$ of the approaching aircraft and also the angle $\theta$ at which the aircraft is approaching may be measured continuously over a period $x-y-z$. The desired glide path P being for this embodiment a straight line characterised by a constant ratio between the range $r$ of the aircraft and the related height $h$ above ground for all positions over the period $x-y-z$.

Figure 3:
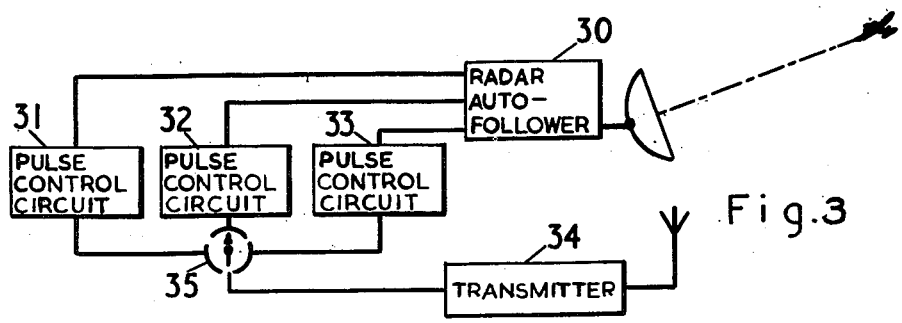
Figure 3 is a block schematic diagram of the ground equipment for landing-aid purposes.

Figure 3 indicates schematically a suitable form of the equipment for use at point T. Radar equipment 30, preferably of a type capable of automatically locking on to and following a chosen reflecting object, provides three items of information— (1) the range $r$ of the aircraft at any instant, (2) the angle of elevation $\theta$ of the aircraft and (3) the angle $a$ of the aircraft bearing in azimuth. These three items are used respectively in pulse interval control circuits 31, 32 and 33 to control the time spacing between the related pulses of the pairs of three interspaced series of pulse pairs. A pulse pair of each series is radiated in turn by the allocation of the control of a pulse transmitter 34 to each of the circuits 31, 32 and 33 in turn by means of a rotating switch 35.

Figure 4:
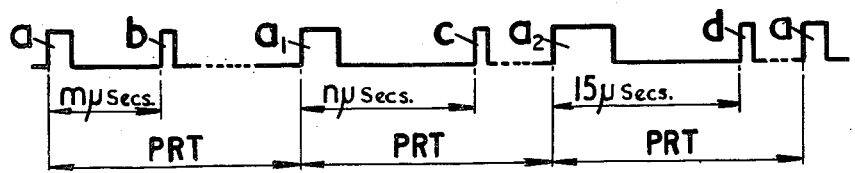
Figure 4 is a diagram illustrating the form of pulse transmission used with the landing-aid system.

Figure 4 illustrates the form of pulse output from the transmitter 34. The related pulses of the pair $a, b$ belonging to the first series are separated in time by a time interval of $m$ microseconds determined in circuit 31 and governed by the range $r$ of the aircraft. The related pulses of the pair $a1, c$ belonging to the second series are separated by a time interval of $n$ microseconds determined in circuit 32 and which is a measure of the height $h$ of the aircraft, resolved within the radar equipment by computation of $r \sin \theta$. The related pulses of the pair $a2, d$ belonging to the third series are separated by an amount determined in circuit 33 and governed by the azimuth bearing of the aircraft.

A pre-determined time spacing, e. g. 15 microseconds, is chosen to represent the correct approach bearing and deviations therefrom to port or starboard arranged to cause increase or decrease respectively of the 15 microsecond spacing time. The various pulses $a, a1,$ and $a2$ occur at regular intervals PRT and the pulse-pair sequence is repeated continuously, the various time spacing of the related pulses of each of the pairs being altered under the control of the radar apparatus as the aircraft position changes.

Figure 5:
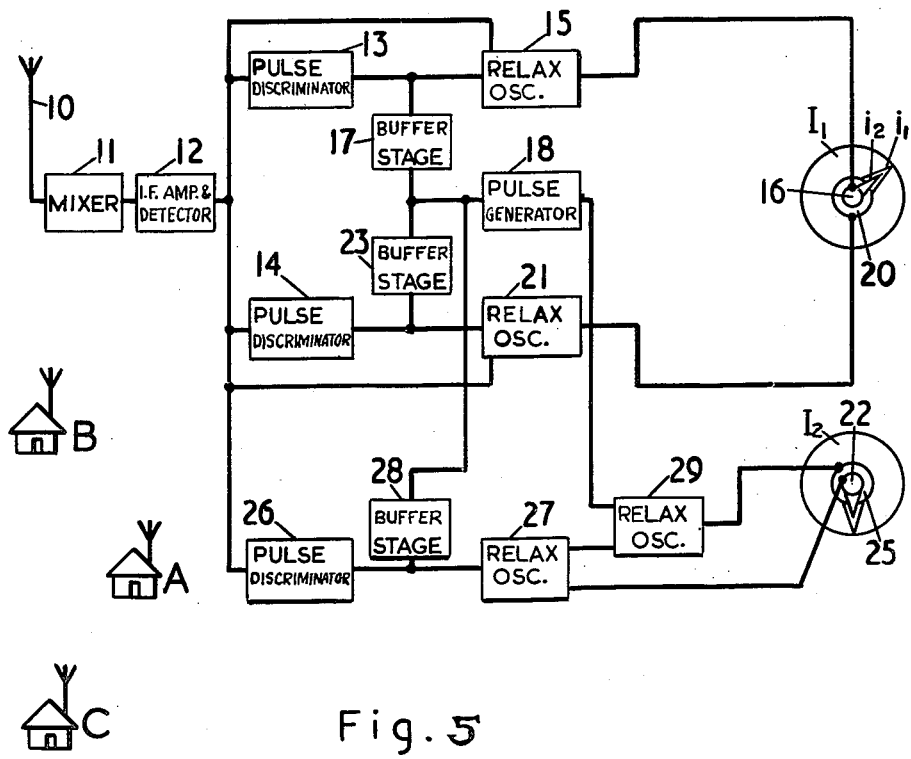
Figure 5 is a block schematic of another form of apparatus for use in the mobile craft.

In the aircraft, the apparatus shown in Figure 1 is modified as shown in Figure 5, the elements having the same references in Figure 5 as those in Figure 1, being of identical construction. As shown in Figure 5, the outputs from units 15 and 21 are fed to the two meter movements 16 and 20, respectively, of the indicator $I_1$. The indicator $I_1$ is similar to the indicator $I_1$ in Figure 1. However, the connections to the meters are such that the pointers $I_1$ and $I_2$ move in the same direction for increasing current and in this case indicate the range of the aircraft from the point T and the height $h$ of the aircraft above the ground respectively. By suitable adjustment of the values of the applied currents, for example, by placing a normal shunt resistor across one or both of the meter windings, the continued alignment of the two meter pointers as they each move towards the zero scale indication will result in the descent of the aircraft down the path P of Figure 2.

The correct azimuth bearing of approach is provided by the second indicator $I_2$ which is supplied by way of a third chain of apparatus comprising a pulse discriminator 26, a relaxation oscillator 27, a buffer stage 28, and a relaxation oscillator 29 connected as shown in the Figure 1. The construction of these units 26 to 29 is similar to that of units 13, 15, 17 and 19, respectively, described with reference to Figure 1. The meters 22 and 25 of the indicator $I_2$, which are similar to those of the meter $I_2$ described with reference to Figure 1, are connected in relation to the relaxation oscillators 27 and 29 in the same manner as that already described with regard to the meter $I_2$ in relation to the relaxation oscillators 15 and 19, respectively, of Figure 1. The meter $I_2$ is preferably arranged, for example by means of series resistors in the meter leads, so that the correct approach bearing is indicated by one pointer being diammetrically opposed to the other across the face of the meter.

It will be noted that the appropriate one of the $a, a1$ or $a2$ pulses is selected for operation of its own chain of apparatus by the provision of different pulse lengths to each series as before, e. g. pulse $a$ is of two micro-seconds, that of $a1$, three micro-seconds and that of $a2$, 5 micro-seconds.

The use of a straight line glide path as shown at P in Figure 2 is not essential. If desired a curved glide path as shown at $P_1$ in that figure may be provided. This may be achieved by arranging the pulse spacing of the $a1, c$ pairs to conform to the related spacing of the range indicating pairs $a, b$ provided the descending aircraft is correctly located at the various positions along the required curved glide path $P_1$ instead of the straight path P. For example, in the embodiment previously described the pulse spacings of the pairs $a, b$ and $a1c$ will be such as produce aligned pointed indications by the two motors of indication $I_{1a}$ at points $x1, y1, z1$ and so on.

In a simplified embodiment, which, however, does not provide the aircraft with a range indication, one series of pulse pairs serves to indicate the angle $\theta$ of the approach path P and the second series the azimuth angle of approach as before. With this arrangement no change of connection of the meters $I_1$, $I_2$ is necessary and the provision of a third chain of apparatus, e. g. 26 to 29 is not required. As before, a curved glide path may be provided by transmitting the first pair with an appropriate constant value of spacing provided with aircraft position conforms the required curved glide path which however will nevertheless have a varying value of $\theta$.

The apparatus described above with relation to Figure 1 may also be used in a navigation system providing an indication of a chosen route between two points. In this system pairs of ground transmitters located one on either side of the route are provided at suitable intervals therealong. One transmitter is arranged to trigger the second transmitter of each pair whereby the required course is indicated in the mobile craft by a constant time interval value. By providing similar conditions of operation at each pair and by the use of a common operating frequency, with the pulse widths used by the various pairs of transmitters along the route related alternately to the receiver channels feeding the indicators $I_1$ and $I_2$ advantage may be taken of each of two adjacent pairs at intermediate points by virtue of simultaneous indications on each indicator. Before one indicator channel becomes inoperative owing to increasing range, the other is properly operative to provide the required guidance owing to decreasing range.

I claim:

1. A radio receiver for measuring the time interval between pulses forming a pair in a received series of repeated pairs of signal pulses, comprising a first generator for generating a first rectangular waveform pulse initiated by the first signal pulse in said pair of signal pulses and terminated by the second signal pulse in said pair of signal pulses, a first meter fed with said first rectangular waveform pulse and with subsequent pulses similarly generated, a second generator for generating short pulses and having a constant repetition time rate which is so fast that several pulses will be generated during the aforesaid rectangular pulses, means for triggering said second generator with said first signal pulse so that one of said short pulses coincides with said first signal pulse, a third generator for generating a second rectangular waveform pulse initiated by the back edge of said first rectangular waveform pulse and terminated by the next occurring of said short pulses, a second meter fed with said second rectangular waveform pulse and by subsequent pulses similarly generated.

2. A receiver according to claim 1 and in which the said first and second meters have separate pointers operating in front of a common scale plate.

3. A radio receiver for measuring the time intervals between pulses comprising means receiving repeated pairs of signal pulses in which at least the first pulses, of a first series of pulse pairs, differ in duration from the duration of other pulses received, a pulse duration discriminating circuit for passing selectively said first signal pulse of the first series, a first generator for generating a first rectangular waveform pulse and fed by the output from said discriminating circuit to initiate said first rectangular waveform pulse by said first signal pulse and fed by the second signal pulse of that pair which included said first signal pulse to terminate said first rectangular waveform pulse, a first calibrated meter fed with said first rectangular waveform pulse and subsequent pulses similarly generated, a second generator for generating short pulses having a constant repetition time and having the pulses thereof so spaced that the time between such pulses is equal to that time interval required for the first rectangular waveform pulse to exist in order to advance said meter one unit of calibration, means for triggering said second generator by the output of said discriminating circuit so that one of said short pulses coincides with said first signal pulse of the first series, a third generator for generating a second rectangular waveform initiated by the back edge of said first rectangular waveform pulse and terminated by the next occurring of said short pulses, and a second meter fed with said second rectangular waveform pulse and subsequent pulses similarly generated.

JOHN NORMAN DE GRUCHY.

REFERENCES CITED

The following references are of record in the file of this patent:

UNITED STATES PATENTS

| Number | Name | Date |
| --- | --- | --- |
| 2,216,707 | George | Oct. 1, 1940 |
| 2,288,196 | Kramar | June 30, 1942 |
| 2,406,970 | Smith | Sept. 3, 1946 |
| 2,412,111 | Wilson | Dec. 3, 1946 |
| 2,421,018 | De Rosa | May 27, 1947 |
| 2,430,570 | Hulst, Jr. | Nov. 11, 1947 |
| 2,436,655 | Locke | Feb. 24, 1948 |
| 2,442,692 | Hulst | June 1, 1948 |
| 2,444,445 | Isbister | July 6, 1948 |